(12) United States Patent
Pollard et al.

(10) Patent No.: US 12,392,427 B2
(45) Date of Patent: Aug. 19, 2025

(54) INSULATED FLUID LINES IN CHEMICAL MECHANICAL POLISHING

(71) Applicant: Applied Materials, Inc., Santa Clara, CA (US)

(72) Inventors: Chad Pollard, San Jose, CA (US); Hari Soundararajan, Sunnyvale, CA (US); Paul D. Butterfield, San Jose, CA (US); Shou-Sung Chang, Mountain View, CA (US); Haosheng Wu, San Jose, CA (US); Calvin Lee, Oakland, CA (US); Balasubramaniam Coimbatore Jaganathan, Bangalore (IN)

(73) Assignee: Applied Materials, Inc., Santa Clara, CA (US)

( * ) Notice: Subject to any disclaimer, the term of this patent is extended or adjusted under 35 U.S.C. 154(b) by 487 days.

(21) Appl. No.: 17/680,163

(22) Filed: Feb. 24, 2022

(65) Prior Publication Data

US 2022/0282807 A1 Sep. 8, 2022

Related U.S. Application Data

(60) Provisional application No. 63/156,864, filed on Mar. 4, 2021.

(51) Int. Cl.
*F16L 11/12* (2006.01)
*B24B 57/02* (2006.01)
*F16L 11/127* (2006.01)

(52) U.S. Cl.
CPC ............ *F16L 11/127* (2013.01); *B24B 57/02* (2013.01)

(58) Field of Classification Search
CPC ........ F16L 11/1185; F16L 9/125; F16L 11/12; F16L 11/127; F16L 9/12; B24B 37/04;
(Continued)

(56) References Cited

U.S. PATENT DOCUMENTS 3,828,112 A * 8/1974 Johansen ............... F16L 11/127
174/106 SC
4,229,613 A * 10/1980 Braun .................. H01B 7/0072
138/109
(Continued)

FOREIGN PATENT DOCUMENTS

CN 105793703 7/2016
CN 107650434 2/2018
(Continued)

OTHER PUBLICATIONS

KR-20140113027-A English Translation (Year: 2014).*
(Continued)

*Primary Examiner* — Eric J Rosen
*Assistant Examiner* — John C Merino
(74) *Attorney, Agent, or Firm* — Fish & Richardson P.C.

(57) ABSTRACT

A polishing assembly includes a chemical mechanical polishing system, a fluid source, and a fluid delivery conduit to carry a fluid from the fluid source into the chemical mechanical polishing system. The chemical mechanical polishing system including a platen to support a polishing pad, a carrier head to support a substrate and bring the substrate into contact with the polishing pad, and a motor to cause relative motion between platen and the carrier head. The fluid delivery conduit includes electrically insulative tubing, a conductive wrapper wrapped around an outer diameter of the tubing from a first end of the tubing to a second end of the tubing, and a conductive wire attached to the conductive wrapper first end. The conductive wrapper is configured to conduct an electrostatic discharge, and the conductive wire is configured to conduct the electrostatic discharge from the conductive wrapper to a grounding source.

14 Claims, 3 Drawing Sheets

(58) Field of Classification Search
CPC ....... B24B 37/015; B24B 37/20; B24B 37/27; B01D 15/24; B32B 1/08; B32B 3/08; G01N 30/60; H01L 21/6708; H01L 21/6838; H01L 21/2885; H01L 21/68707; G05D 23/2401

See application file for complete search history.

(56) References Cited

U.S. PATENT DOCUMENTS

| | | | |
|---|---|---|---|
| 6,206,760 | B1 | 3/2001 | Chang et al. |
| 6,224,461 | B1* | 5/2001 | Boehm, Jr. ........... B24B 37/015 451/7 |
| 6,508,258 | B1 | 1/2003 | Lorimer |
| 2003/0190874 | A1 | 10/2003 | So |
| 2004/0238481 | A1 | 12/2004 | Wang et al. |
| 2010/0279435 | A1* | 11/2010 | Xu ......................... B24B 55/02 156/345.13 |
| 2014/0323017 | A1 | 10/2014 | Tang et al. |
| 2017/0003256 | A1 | 1/2017 | Ziegler et al. |
| 2019/0143476 | A1 | 5/2019 | Wu et al. |
| 2020/0103056 | A1 | 4/2020 | Puglia et al. |
| 2020/0376522 | A1 | 12/2020 | Wu et al. |
| 2020/0406310 | A1 | 12/2020 | Soundararajan et al. |
| 2021/0008684 | A1* | 1/2021 | Matsushita ............. B24B 37/20 |
| 2022/0221086 | A1* | 7/2022 | Leys ...................... H01B 3/445 |

FOREIGN PATENT DOCUMENTS

| | | |
|---|---|---|
| EP | 0530507 | 3/1993 |
| JP | H07-142465 A | 6/1995 |
| JP | H07-41184 U | 7/1995 |
| JP | 2001-203183 A | 7/2001 |
| JP | 2010-249172 A | 11/2010 |
| JP | 2016-121801 A | 7/2016 |
| WO | WO 2021/030356 | 2/2021 |

OTHER PUBLICATIONS

Caulfield et al., "Reducing ESD in Semiconductor Fluoropolymer Fluid Handling Systems While Maintaining Chemical Purity," Solid State Technology, Oct. 2016, 6 pages.
Entegris.com [online], "FluoroLine® Electrostatic Dissipative (ESD) Tubing," upon information and belief, available no later than Jul. 28, 2020, retrieved on Jun. 18, 2024, retrieved from URL<https://www.entegris.com/content/dam/shared-product-assets/fluoroline-shared/datasheet-fluoroline-esd-tubing-7790.pdf>, 5 pages.
Mcmasters.com [online], "High-Strength Expandable Sleeving," upon information and belief, available no later than Jul. 28, 2020, retrieved on Jun. 18, 2024, retrieved from URL<https://www.mcmaster.com/5726N11/>, 1 pages.
Msesupplies.com [online], "MSE PRO 250 ml Monolayer Graphene Oxide Water Dispersion 4 mg/ml," upon information and belief, available no later than Jul. 28, 2020, retrieved on Jun. 18, 2024, retrieved from URL<https://www.msesupplies.com/products/graphene-oxide-water-dispersion-250-ml-4-mg-graphene-oxide-per-ml-water?variant=33338321679&utm_medium=cpc&utm_source=google&utm_campaign=Google%20Shopping&gclid=EAIaIQobChMI1KzblLHc6gIVEQnnCh20XQ98EAQYASABEgKVAfD_BwE>, 5 pages.
Nichias.co.jp [online], "Tombo Brand: Semiconductor and FPD Related Products," upon information and belief, available no later than Jul. 28, 2020, retrieved on Jun. 18, 2024, retrieved from URL<https://www.nichias.co.jp/cms/nichias/pdf/catalog/E43.pdf>, 26 pages.
Tapecase.com [online], "SG56-06 1' X 36YD," upon information and belief, available no later than Jul. 28, 2020, retrieved on Jun. 18, 2024, retrieved from URL<https://www.tapecase.com/products/sg56-06-semi-conductive-abrasion-resistant-fiberglass-tape-coated-with-teflon-ptfe/sg56-06-1-x-36yd>, 3 pages.
International Search Report and Written Opinion in International Appln. No. PCT/US2022/017719, dated Jun. 2, 2022, 15 pages.
Office Action in Taiwanese Appln. No. 111107468, dated Jan. 7, 2023, 12 pages (with English summary and search report).
Office Action in Japanese Appln. No. 2023-553581, dated Oct. 1, 2024, 7 pages (with English translation).
Office Action in Japanese Appln. No. 2023-553581, mailed Apr. 15, 2025, 6 pages (with English translation).

\* cited by examiner

INSULATED FLUID LINES IN CHEMICAL MECHANICAL POLISHING

CROSS-REFERENCE TO RELATED APPLICATIONS

This application claims priority to U.S. Application Ser. No. 63/156,864, filed on Mar. 4, 2021, the disclosure of which is incorporated by reference.

TECHNICAL FIELD

The present disclosure relates to chemical mechanical polishing (CMP), and more particularly to fluid delivery in CMP.

BACKGROUND

An integrated circuit is typically formed on a substrate by the sequential deposition of conductive, semiconductive, or insulative layers on a semiconductor wafer. A variety of fabrication processes require planarization of a layer on the substrate. For example, one fabrication step involves depositing a filler layer over a non-planar surface and planarizing the filler layer. For certain applications, the filler layer is planarized until the top surface of a patterned layer is exposed, or until a predetermined thickness of material remains over an underlying layer.

Chemical mechanical polishing (CMP) is one accepted method of planarization. This planarization method typically requires that the substrate be mounted on a carrier head. The exposed surface of the substrate is typically placed against a rotating polishing pad. The carrier head provides a controllable load on the substrate to push it against the polishing pad. A polishing slurry with abrasive particles is typically supplied to the surface of the polishing pad. A cleaning fluid, e.g., deionized water, can be sprayed onto the polishing pad to remove debris from the polishing process.

SUMMARY

In one aspect, a polishing assembly includes a chemical mechanical polishing system, a fluid source, and an a fluid delivery conduit to carry a fluid from the fluid source into the chemical mechanical polishing system. The chemical mechanical polishing system includes a platen to support a polishing pad, a carrier head to support a substrate and bring the substrate into contact with the polishing pad, and a motor to cause relative motion between platen and the carrier head. The fluid delivery conduit includes electrically insulative tubing, a conductive wrapper wrapped around an outer diameter of the tubing from a first end of the tubing to a second end of the tubing, the conductive wrapper configured to flow an electrostatic discharge, and a conductive wire attached to the conductive wrapper first end, the conductive wire configured to conduct the electrostatic discharge from the conductive wrapper to a grounding source.

In another aspect, an electrically insulative tubing configured to flow a fluid into a chemical mechanical polishing system includes a conductive wrapper wrapped around an outer diameter of the tubing from a first end of the tubing to a second end of the tubing, the conductive wrapper configured to conduct an electrostatic charge, and a conductive wire attached to the conductive wrapper, the conductive wire configured to conduct the electrostatic charge from the conductive wrapper to a common grounding source.

In another aspect, a method of fabricating a fluid conduit includes wrapping a conductive wrapper around a tubing, and coupling a conductive wire to the conductive wrapper. The tubing is configured to flow a fluid into a chemical mechanical polishing assembly, and the conductive wrapper is configured to form an electrostatic discharge protective assembly to conduct an electrostatic charge.

Implementations may include one or more of the following features. The fluid source may include a reservoir to hold a cleaning liquid. A fluid may be flowed through the electrostatic discharge protective assembly. Responsive to flowing the fluid through the electrostatic discharge protective assembly, an electrostatic charge may be generated on the tubing. The electrostatic charge may be discharged from the tubing through the conductive wrapper to the conductive wire to the common grounding source.

Possible advantages may include, but are not limited to, one or more of the following.

The danger of electrostatic discharge from fluid delivery lines, and thus of damage to fluid delivery lines or other components in a chemical mechanical polishing system, can be reduced. The insulated tubing can be manufactured easily and at low cost. The fluid flowing through the tubing is not at additional risk of contamination.

The details of one or more implementations are set forth in the accompanying drawings and the description below. Other aspects, features, and advantages will be apparent from the description and drawings, and from the claims.

BRIEF DESCRIPTION OF THE DRAWINGS

Like reference symbols in the various drawings indicate like elements.

DETAILED DESCRIPTION

A chemical mechanical polishing system includes a fairly large number of fluid delivery lines to deliver a fairly large number of fluids, e.g., deionized water, steam, nitrogen gas. For example, a typical system can include fluid delivery lines to carry slurry to the polishing pad, to carry cleaning liquid to the polishing pad to remove polishing debris, to carry heated or cooled fluid to the polishing pad to control the temperature of the polishing process, to carry pressurized gas for pneumatic control of the pressure in a carrier head, etc. Static electricity build-up in these fluid delivery lines can be caused by tribo-charging or by electrostatic induction. If the static electricity build-up becomes too large, electrostatic discharge can result, damaging components and tubing along the fluid delivery lines. In particular, static electricity tends to particularly occur in fluid lines that carry hot gas, e.g., steam. The combination of vapor and temperature can result in tribo-charging that is not observed in conventional systems that do not use steam.

A traditional approach for electrostatic dissipative (ESD) tubing is to place a conductive layer, e.g., of carbon, on the inside of the tubing. However, particles of the material coating the inside of the tubing can be carried by the fluid to the polishing system, resulting in contamination of and defects on the substrate. Moreover, the polishing environment can be humid and wet with splashing slurry, so a conductive layer on the outside of the tubing can be subject to oxidation or environmental wear.

A technique that may be suitable is to use polymer tubing that wrapped with a conductive material, and with a heat shrink tubing then applied over the conductive material. The conductive material can then be grounded.

Figure 1:
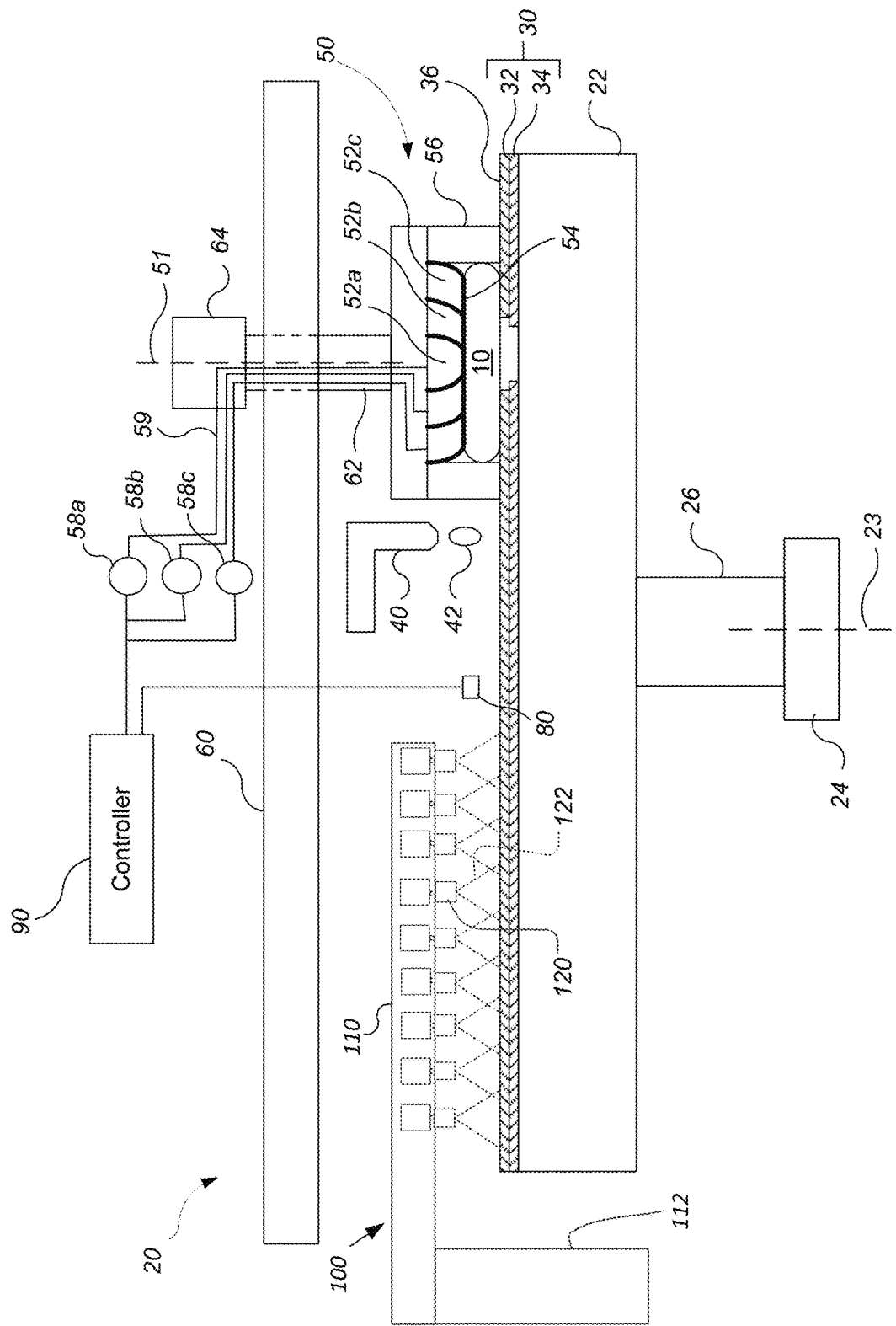
FIG. 1 is a schematic cross-sectional view of an example of a polishing station of the polishing apparatus.
Figure 2:
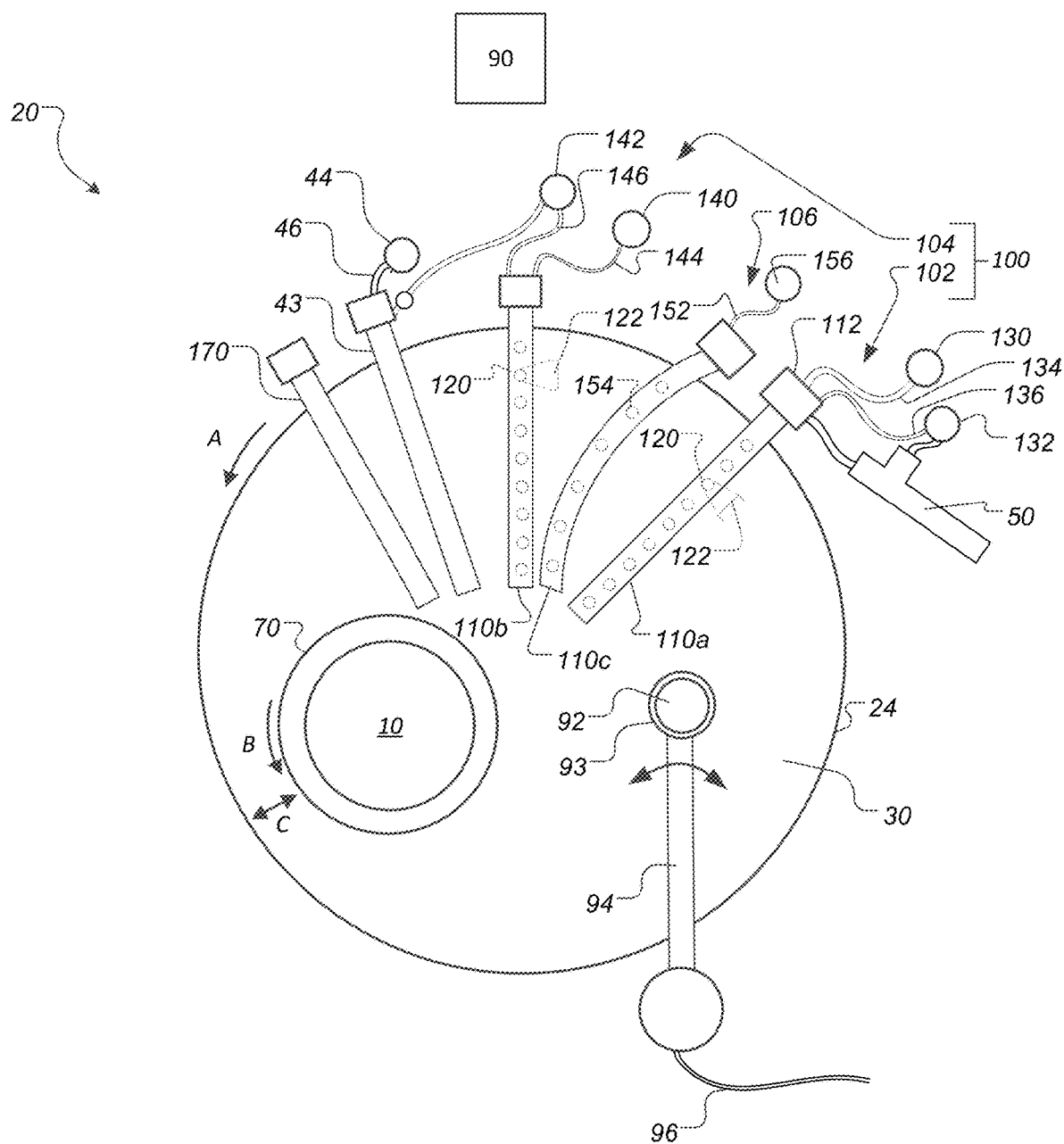
FIG. 2 is a schematic top view of an example polishing station of the chemical mechanical polishing apparatus.

FIGS. 1 and 2 illustrate an example of a polishing station 20 of a chemical mechanical polishing system. The polishing station 20 includes a rotatable disk-shaped platen 24 on which a polishing pad 30 is situated. The platen 24 is operable to rotate (see arrow A in FIG. 2) about an axis 23. For example, a motor 22 can turn a drive shaft 26 to rotate the platen 24. The polishing pad 30 can be a two-layer polishing pad with an outer polishing layer 34 and a softer backing layer 32.

The polishing station 20 can include a supply port 40, e.g., at the end of a slurry delivery arm 43, to dispense a polishing liquid 42, such as an abrasive slurry, onto the polishing pad 30. The polishing liquid 42 can be delivered from a reservoir 44 through a fluid delivery line 46, e.g., by a pump.

The polishing station 20 can include a pad conditioner 90 with a conditioner disk 92 (see FIG. 2) to maintain the surface roughness of the polishing pad 30. The conditioner disk 92 can be positioned in a conditioner head 93 at the end of an arm 94. Pressuring of the conditioner disk 92 against the polishing pad 30 can be controlled pneumatically, e.g., by pressurized gas, e.g., $N_2$, in a fluid delivery line 96.

A carrier head 50 is operable to hold a substrate 10 against the polishing pad 30. The carrier head 50 can also include a retaining ring 56 to maintain the lateral position of the substrate 10 below the carrier head. The carrier head 50 is suspended from a support structure 60, e.g., a carousel or a track, and is connected by a drive shaft 62 to a carrier head rotation motor 64 so that the carrier head can rotate about an axis 51. Optionally, the carrier head 50 can oscillate laterally, e.g., on sliders on the carousel, by movement along the track, or by rotational oscillation of the carousel itself.

The carrier head 50 can include a flexible membrane 54 having a substrate mounting surface to contact the back side of the substrate 10, and a plurality of pressurizable chambers 52a-52c to apply different pressures to different zones, e.g., different radial zones, on the substrate 10. Pressure to the chambers 52a-52c can be controlled by pressure regulators 58a-58c. The pressure regulators 58a-58c can be coupled through pneumatic lines 59 that pass through a rotary union and the drive shaft 62 and carry pressurized gas, e.g., $N_2$, to the respective chambers 52a-52c.

In operation, the platen is rotated about its central axis 23, and the carrier head is rotated about its central axis 51 (see arrow B in FIG. 2) and translated laterally (see arrow C in FIG. 2) across the top surface of the polishing pad 30.

As the carrier head 50 and conditioner head 92 sweep across the polishing pad 30, any exposed surfaces tend to become covered with slurry. For example, slurry can stick to the outer or inner diameter surface of the retaining ring 56. In general, for any surfaces that are not maintained in a wet condition, the slurry will tend to coagulate and/or dry out, resulting in corrosion of the parts and particulates and defects on the substrate. One solution is to clean the components, e.g., the carrier head 50 and conditioner head 93, e.g., with a jet of water or steam. A carrier head cleaner, e.g., steam treating assembly, for the carrier head can be part of the load cup in the polishing system. Similarly, a conditioner head cleaner, e.g., a steam treating assembly, for the conditioner head can be part of a conditioner head cleaning cup. In either case, tubing is need to carry the cleaning fluid, e.g., liquid water or steam, to the cleaner.

In some implementations, the polishing station 20 includes a temperature sensor 80 to monitor a temperature in the polishing station or a component of/in the polishing station, e.g., the temperature of the polishing pad 30 and/or polishing liquid 38 on the polishing pad. For example, the temperature sensor 80 could be an infrared (IR) sensor, e.g., an IR camera. Alternatively or in addition, the temperature sensor could be a contact sensor rather than a non-contact sensor. For example, the temperature sensor 80 can be thermocouple or IR thermometer positioned on or in the platen 24. In addition, the temperature sensor 80 can be in direct contact with the polishing pad.

The polishing system 20 can also includes a temperature control system 100 to control the temperature of the polishing pad 30 and/or polishing liquid 38 on the polishing pad. The temperature control system 100 can include a cooling system 102 and/or a heating system 104. At least one, and in some implementations both, of the cooling system 102 and heating system 104 operate by delivering a temperature-controlled medium, e.g., a liquid, vapor or spray, onto the polishing surface 36 of the polishing pad 30 (or onto a polishing liquid that is already present on the polishing pad).

As shown in FIG. 1, an example temperature control system 100 includes one or more arms 110 that extends over the platen 24 and polishing pad 30. Multiple nozzles 120 are suspended from or formed in each arm 110, and each nozzle 120 is configured to deliver a temperature control fluid onto the polishing pad 30, e.g., spray the fluid onto the polishing pad.

To operate as a cooling system, the temperature control fluid is a coolant. The coolant be a gas, e.g., air, or a liquid, e.g., water. The coolant can be at room temperature or chilled below room temperature, e.g., at 5-15° C. The coolants used in the cooling system 102 can include, for example, cold water, liquid nitrogen, or gas formed from liquid nitrogen and/or dry ice. In some implementations, droplets of liquid, e.g., water, ethanol or isopropyl alcohol, can be added to a gas flow. In some implementations, the cooling system uses a spray of air and liquid, e.g., an aerosolized spray of liquid, e.g., water. In particular, the cooling system can have nozzles that generate an aerosolized spray of water that is chilled below room temperature.

As shown in FIG. 2, the cooling system 102 can include a source 130 of liquid coolant medium and/or a source 132 of gas coolant medium. Liquid from the source 130 and gas from the source 132 can be carried by tubing 134, 136 to and inside the arm 110, before being directed through the nozzle 120, e.g., to form the spray 122. When dispensed, this coolant can be below room temperature, e.g., from −100 to 20° C., e.g., below 0° C.

Gas, e.g., compressed gas, from the gas source 132 can be connected to a vortex tube 50 that can separate the compressed gas into a cold stream and a hot stream, and direct the cold stream to the nozzles 120 onto the polishing pad 30. In some implementations, the nozzles 120 are the lower ends of vortex tubes that direct a cold stream of compressed gas onto the polishing pad 30.

To operate as a heating system, the temperature control fluid is a heated fluid. The heating fluid can be a gas, e.g., steam or heated air, or a liquid, e.g., heated water, or a combination of gas and liquid. The heating fluid is above room temperature, e.g., at 40-120° C., e.g., at 90-110° C. The fluid can be water, such as substantially pure de-ionized water, or water that includes additives or chemicals. In some implementations, the heating system uses a spray of steam, or a combination of steam and liquid water. The steam can includes additives or chemicals.

As shown in FIG. 2, the heating system 104 can include a source 140 of heated liquid, e.g., hot water, and/or a source 142 of heated gas, e.g., steam. For example, the source 142 can be boiler. Liquid from the source 140 and gas from the source 142 can be carried by tubing 144, 146 to and inside the arm 110, before being directed through the nozzle 120 to form the spray 122.

Along the direction of rotation of the platen 24, the arm 110b of the heating system 104 can be positioned between the arm 110a of the cooling system 102 and the carrier head 70. Along the direction rotation of the platen 24, the arm 110b of the heating system 104 can be positioned between the arm 110a of the cooling system 102 and the slurry dispenser arm 43. For example, the arm 110a of the cooling system 102, the arm 110b of the heating system 104, the slurry dispenser arm 43 and the carrier head 70 can be positioned in that order along the direction rotation of the platen 24.

Rather than separate arms, the temperature control system 100 can include a single arm to dispense both the coolant and the heating fluid.

Other techniques can be used by the temperature control system 100, in the alternative or in addition, to control the temperature of the polishing process. For example, heated or cooled fluid, e.g., steam or cold water, can be injected into the polishing liquid 42 (e.g., slurry) to raise or lower the temperature of the polishing liquid 42 before the polishing liquid 42 is dispensed. As another example, resistive heaters could be supported in the platen 22 to heat the polishing pad 30, and/or in the carrier head 50 to heat the substrate 10.

Moderating the temperature of the slurry and polishing pad during polishing of a layer allows for increased interaction between charge-carrying abrasives such as cerium oxide. By using temperature control, the material rate of removal can be beneficially increased by both modulating the physical parameters of the polishing pad as well as altering the chemical interaction characteristics between the charged ceria and filler layer.

In some implementations, the controller 90 receives a signal from the temperature sensor 80 and executes a closed loop control algorithm to control the temperature control system 100, e.g., the flow rate, mixing ratio, pressure, or temperature of the coolant or heating fluid relative, so as to maintain the polishing process at a desired temperature.

In some implementations, an in-situ monitoring system measures the polishing rate for the substrate, and the controller 90 executes a closed loop control algorithm to control the temperature control system, e.g., the flow rate or temperature of the coolant or heating fluid relative, so as to maintain the polishing rate at a desired rate.

The polishing station 20 can also include a high pressure rinse system 106. The high pressure rinse system 106 includes a plurality of nozzles 150, e.g., three to twenty nozzles that direct a cleaning fluid, e.g., water, at high intensity onto the polishing pad 30 to wash the pad 30 and remove used slurry, polishing debris, etc. The cleaning fluid can flow from a source 156 of cleaning fluid, e.g., a reservoir of deionize water, through tubing 152 to the nozzles 150.

An example rinse system 106 includes an arm 110c that extends over the platen 24 and polishing pad 30. Along the direction of rotation of the platen 24, the arm 110c of the rinse system 106 can be between the arm 110a of the cooling system 102 and the arm 110b of the heating system 104.

In some implementations, the polishing station 20 includes a wiper blade or body 170 to evenly distribute the polishing liquid 42 across the polishing pad 30. Along the direction of rotation of the platen 24, the wiper blade 170 can be between the slurry dispenser arm 43 and the carrier head 70.

Although FIG. 2 illustrates separate arms for each subsystem, e.g., the heating system 102, cooling system 104 and rinse system 106, various subsystems can be included in a single assembly supported by a common arm. Various fluid delivery components, e.g., tubing, passages, etc., can extend inside each body.

Figure 3:
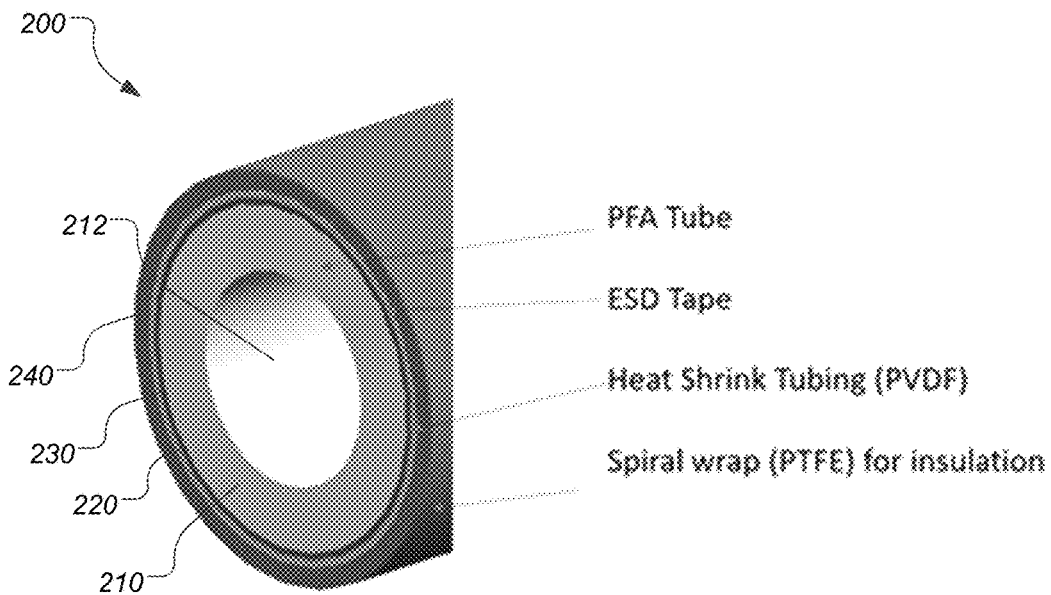
FIG. 3 is a schematic perspective view, partially cross-sectional, of tubing having an electrostatic discharge protective assembly for conduits in a chemical mechanical polishing system.
Figure 4A:
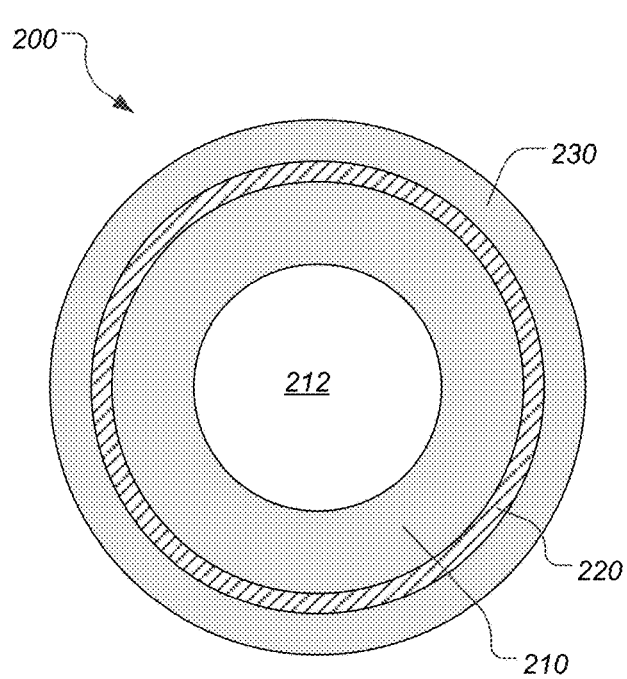
FIG. 4A is a schematic cross-sectional front view of the tubing.
Figure 4B:
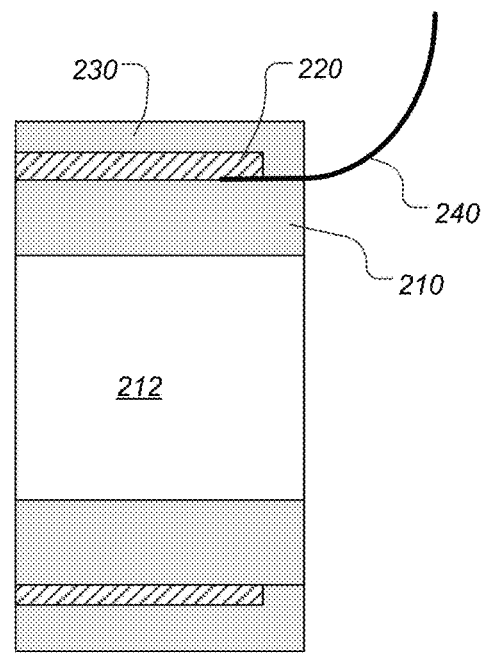
FIG. 4B is a schematic cross-section side view through an end of the tubing.

FIGS. 3, 4A and 4B illustrate a fluid delivery line 200 that is suitable for use in a chemical mechanical polishing system. The fluid delivery line 200 could be used for one or more of fluid delivery line 46 for the polishing liquid, pneumatic lines 59 for the carrier head, fluid delivery line 96 for the conditioner head, tubing 134, 136 for the cooling system, tubing 144, 146 for the heating system, tubing 152 for the high pressure rinse system, tubing for carrying pneumatic and/or cleaning fluid to the load cup and/or conditioner cleaner cup, e.g., liquid water or steam, to the cleaner.

The fluid delivery line 200 can be particularly well suited for carrying a hot gas, e.g., steam, as the combination of vapor and temperature can result in a build-up of electrostatic charge that might not occur in room temperature gas or liquid. For example, the fluid delivery line 200 can be used as the tubing 146 to deliver hot gas, e.g., steam, from the source 142, e.g., the boiler, or as the tubing to deliver steam for cleaning the carrier head and/or conditioner head in the load cup and/or conditioner cleaner cup.

The fluid delivery line 200 includes a polymer tubing 210, which is wrapped by a conductive layer 220. The polymer tubing can be a material that is electrically insulative and resistant to temperatures of up to 100° and is inert to fluid passing through the delivery line 200 and inert to the polishing process. For example, the polymer tubing can be a perfluoroalkoxy alkane (PFA). The polymer tubing 210 has an interior channel 212 through which the fluid flows.

A conductive layer 220 is wrapped around the polymer tubing 210 along the length of the fluid delivery line 200. The conductive layer 220 can be a continuous layer, or a wire mesh. The conductive layer 220 can be a conductive metal, e.g., copper. Alternatively or in addition, the conductive layer 220 can be a conductive or semi-conductive form of carbon, e.g., electro-conductive carbon black. A semi-conductive polymer tape or carbon-covered tape could also be used as the conductive layer 220. The conductive layer can be high resistance conductive tape, e.g., up to 20000 ohm for a 10' length. In contrast, a carbon sleeve can have a significantly lower resistance, e.g., 20 ohm for a 10' length. As another option, the conductive layer 220 could be formed by a conductive paint, e.g., graphene paint, spread onto the polymer tubing 210.

At the end of the fluid delivery line 200 the conductive layer can be flared. This can avoid formation of a sharp point at the end of the fluid delivery line, which can reduce danger of electrostatic discharge.

Towards the termination of the tubing at both ends, conductive wiring 240 is attached to the conductive layer 220. This conductive wiring 240 can be connected to a common ground. The conductive wiring 240 can be a stainless steel ground wire. In some implementations, a portion of the conductive wire is placed between the conductive layer 220 and the polymer tubing 210. For example, the conductive wiring 240 can be placed against the polymer tubing 210, and then secured in place by wrapping the conductive tape over the tubing 210 and wiring 240.

Once the conductive layer 210 has been wrapped around the polymer tubing 210, a sheath 230 of another electrically insulative polymer is disposed to directly contact and cover the conducive layer 220. In particular, a heat shrink material, e.g., PVDF, PTFE, or another material, is applied over the conductive layer 220. For example, the assembly of the polymer tubing with conductive layer 220 can be inserted to extend through heat shrink tubing. The heat shrink tubing is then heat treated to cause the material to contract and tightly contact the conducive layer 220.

Optionally, an additional layer 240 of insulation material, e.g., EPDM, PTFE, PFA, can surround the heat-shrink layer for thermal insulation.

This fluid delivery line can provide a ground path for accumulated charge, and thus reduce the risk of component damage, while still remaining compatible with the polishing process. In addition, the heat shrink tubing protects the outside of the fluid delivery line from to splashing of liquids in the environment, which can also prevent defects and contamination.

A number of embodiments of the invention have been described. Nevertheless, it will be understood that various modifications may be made without departing from the spirit and scope of the invention. Accordingly, other embodiments are within the scope of the following claims.

What is claimed is:

1. A chemical mechanical polishing assembly, comprising:
   a chemical mechanical polishing system including a platen to support a polishing pad, a carrier head to support a substrate and bring the substrate into contact with the polishing pad, and a motor to cause relative motion between the platen and the carrier head;
   a fluid source comprising a boiler, the boiler configured to generate steam from liquid water; and
   a fluid delivery conduit to carry the steam from the fluid source into the chemical mechanical polishing system, the fluid delivery conduit having a first end and a second end, the fluid delivery conduit including
   electrically insulative tubing configured to conduct the steam from the fluid source to the chemical mechanical polishing system,
   a conductive wrapper wrapped around an outer diameter of the electrically insulative tubing from a first end of the electrically insulative tubing to a second end of the electrically insulative tubing, the conductive wrapper configured to flow an electrostatic discharge formed responsive to flowing the steam through the electrically insulative tubing,
   a conductive wire attached to the conductive wrapper at the first end of the fluid delivery conduit, the conductive wire configured to flow the electrostatic discharge from the conductive wrapper to a grounding source, and
   a heat shrink tubing surrounding the electrically insulative tubing and the conductive wrapper, wherein the heat shrink tubing extends along the electrically insulative tubing beyond the conductive wrapper, and wherein the conductive wire includes a portion extending between the electrically insulative tubing and the heat shrink tubing to an end sandwiched between an inner diameter of the conductive wrapper and an outer diameter of the electrically insulative tubing.

2. The assembly of claim 1, wherein the fluid source comprises a reservoir to hold a polishing fluid, the chemical mechanical polishing system includes a dispenser to deliver the polishing fluid to the polishing pad, and the fluid delivery conduit couples the reservoir to the dispenser.

3. The assembly of claim 1, wherein the fluid source comprises a source of cleaning fluid, the chemical mechanical polishing system includes a dispenser to deliver the cleaning fluid to the polishing pad, a conditioner head, or the carrier head, and the fluid delivery conduit couples the fluid source to the dispenser.

4. The assembly of claim 1, wherein the fluid source comprises a source of temperature control fluid, the chemical mechanical polishing system includes a dispenser to deliver the temperature control fluid to the polishing pad, and the fluid delivery conduit couples the fluid source to the dispenser.

5. The assembly of claim 1, wherein the fluid source comprises a pressure line, wherein the carrier head includes one or more pressurizable chambers, and the fluid delivery conduit couples the pressure line to the carrier head.

6. The assembly of claim 3, wherein the fluid source comprises a pressure line, wherein the conditioner head includes one or more pressurizable chambers, and the fluid delivery conduit couples the pressure line to the conditioner head.

7. The assembly of claim 1, comprising a grounding wire coupled to the conductive wrapper.

8. A fluid conduit comprising:
   electrically insulative tubing configured to flow a fluid into a chemical mechanical polishing system,
   a conductive wrapper wrapped around an outer diameter of the electrically insulative tubing from a first end of the electrically insulative tubing to a second end of the electrically insulative tubing, the conductive wrapper configured to conduct an electrostatic charge; a conductive wire attached to the conductive wrapper, the conductive wire configured to conduct the electrostatic charge from the conductive wrapper to a common grounding source; and
   a heat shrink tubing surrounding the electrically insulative tubing and the conductive wrapper, wherein the heat shrink tubing extends along the electrically insulative tubing beyond the conductive wrapper, and wherein the conductive wire includes a portion extending between the electrically insulative tubing and the heat shrink tubing to an end sandwiched between an inner diameter of the conductive wrapper and an outer diameter of the electrically insulative tubing.

9. The fluid conduit of claim 8, wherein the conductive wrapper is a metallic wire.

10. The fluid conduit of claim 9, wherein the metallic wire is a metallic wire mesh.

11. The fluid conduit of claim 8, wherein the conductive wrapper is a conductive or semi-conductive polymer tape.

12. The fluid conduit of claim 8, further comprising an insulating layer surrounding the heat shrink tubing and the conductive wrapper.

13. The fluid conduit of claim 8, wherein an end of the conductive wire is coupled to an inner diameter of the conductive wrapper.

14. The fluid conduit of claim 8, wherein the electrically insulative tubing extends past an end of the conductive wrapper.

\* \* \* \* \*